United States Patent [19]

Luchaco

[11] 4,236,101
[45] Nov. 25, 1980

[54] LIGHT CONTROL SYSTEM
[75] Inventor: David G. Luchaco, Macungie, Pa.
[73] Assignee: Lutron Electronics Co., Inc., Coopersburg, Pa.
[21] Appl. No.: 934,672
[22] Filed: Aug. 18, 1978
[51] Int. Cl.$^2$ ............................................. H05B 37/02
[52] U.S. Cl. ............................ 315/158; 250/214 AL; 315/156; 315/307
[58] Field of Search ............... 315/149, 151, 156, 158, 315/307; 250/205, 214 AL

[56] References Cited

U.S. PATENT DOCUMENTS

| 3,449,629 | 6/1969 | Wigert et al. | 315/151 |
| 4,122,334 | 10/1978 | Owens | 250/214 AL X |
| 4,135,116 | 1/1979 | Smith | 315/158 |

FOREIGN PATENT DOCUMENTS

| 2419699 | 11/1975 | Fed. Rep. of Germany | 315/158 |
| 2426221 | 12/1975 | Fed. Rep. of Germany | 250/214 AL |

Primary Examiner—Eugene R. LaRoche
Attorney, Agent, or Firm—Schiller & Pandiscio

[57] ABSTRACT

In an area illuminated by both artificial and natural light sources, a control system is implemented to reduce the energy consumption by proportionately dimming the artificial sources to a level such that the sum of natural plus artificial light is held essentially constant. Use of an open loop sensing scheme allows the control system to operate over a wide range of conditions with no oscillations and good control of the total illumination level.

13 Claims, 8 Drawing Figures

LIGHT CONTROL SYSTEM

This invention relates to illuminating systems, and more particularly for an area illuminated by both artificial and natural light sources, a system which holds the sum of natural plus artificial light at a predetermined level.

The use of light sensors to control artificial lighting levels to reduce energy requirements is well known in the art. A commonly employed system places the light sensor in a position to receive both artificial and natural illumination from the area being controlled. The light sensor output is used to adjust the artificial illumination so as to keep the total illumination seen by the light sensor constant. Because this system adjusts one of its own inputs, it is considered to be a closed loop or feedback system.

Three major problems make such a system of limited usefulness. First, since the system operates closed loop, it is subject to continuous oscillations unless certain criteria concerning the system gain and phase lag are satisfied. System gain is highly dependent on reflectances and absorption within the controlled area, and these factors vary widely from one installation to another and tend to change in time. The resulting large variations in system gain which are not under control of the system designer, make it difficult to insure that oscillations cannot take place under some conditions. Oscillation results in a rapid continuous fluctuation of the lighting system output which makes the performance of even simple tasks extremely difficult for users of the area, and, for this reason, it is highly undesirable and should never be allowed to occur.

The second problem arises when natural illumination is unevenly available within the area being illuminated, as will typically be the case with vertical wall mounted windows. The useable natural illumination in the area is usually much greater close to the window than it is at positions deeper in the area. Therefore, the extent to which the artificial light must be varied to maintain sufficient total illumination throughout the area, is determined by the lowest amount of natural illumination in the area. If any other value of natural illumination were to be the controlling parameter, points in the area which receive less natural illumination would fall below the required total illumination desired.

For practical purposes, any illumination sensor means, whether used in open or closed loop application, must necessarily view a reasonably large area to minimize the disturbing effects of local variations—dark or light upholstery, floor coverings, personnel motion and so on. Thus, in the closed loop system the sensor will receive an average level of natural illumination, not necessarily the minimum level, because all points in the controlled area contribute to the sensor natural illumination level; in effect, the minimum practical area for illumination averaging may well be much larger than the darkest area of interest in the system. Therefore, it is clear that the natural light level received by the sensor is greater than the minimum natural light level available to area users. Since the closed loop system correction of the artificial light level will be based on this average value of natural illumination, all points in the controlled area which receive less than the average value of natural illumination will not be maintained at the desired total illumination, but will fall below it.

The third problem arises from the difficulty of finding locations in normal situations in which the combination of artificial and natural light impinging on a typical work surface can reliably be sensed, without undue influence from uncontrollable extraneous effects. In effect, since the sensor must be reasonably broad in coverage, it will almost necessarily "see" portions of the room in which natural illuminations predominate, and possibly even the window glass areas themselves, not to mention reflections and other fickle phenomena which arise out of natural illumination and thus may vary swiftly and unpredictably.

In the open loop control system described in the present invention, the light sensor is arranged to respond predominantly to light from areas subjected to primarily natural illumination ordinarily during daylight hours and be relatively insignificantly affected by the artificial illumination level during these hours. Usually, the area in which such natural illumination falls in a system will be much larger than the minimum area recognized for reasonable sensor accuracy. Since the sensor's response to the artificial light is minimal, feedback is minimized or eliminated for all practical purposes so that no oscillation is expected.

The control system of the present invention does not attempt to hold the light sensor output constant as is characteristic of the prior art, but simply reduces the artificial light level in proportion to the increase in natural light level detected by the sensor, it being understood that inverse functions other than simple proportionality can be implemented as desired. The location at which the natural illumination level is sensed becomes relatively unimportant as it is possible to provide a gain control adjustment which provides minimum artificial light when the natural illumination alone is sufficient to provide the desired total illumination even at the point of minimum natural illumination in the specified area.

The sensor in the open loop system of the present invention is intended to measure primarily the natural light which for the closed loop system sensor would constitute noise. For purposes of the present invention the ubiquitous quality of the natural light serves to provide an inherently high signal-to-noise ratio, whereas in the closed-loop application it makes control difficult, if not impossible, by engendering an inherently poor signal-to-noise ratio. Thus, the open loop concept of the present invention inherently uses the photoelectric sensor in an optimum way and also solves the two previous problems of undesired oscillations and insufficient illumination at points receiving less than the average amount of natural light.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein.

Figure 1:
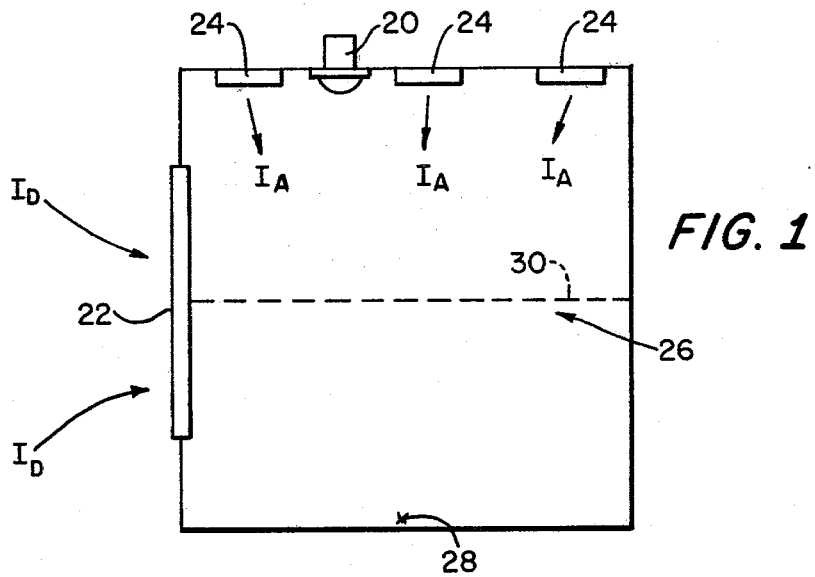
FIG. 1 is a representation of a typical installation of a lamp intensity control photosensor in a room with side-mounted windows.

Shown in FIG. 1 is a typical installation of a ceiling mounted photosensor 20 adjacent a vertical wall mounted window 22 and ceiling mounted artificial lighting fixtures 24 inside room 26. A reference point 28 is where one would place a light meter or other measuring device in the room to evaluate whether the area of the room was receiving a sufficient level of light for the tasks to be performed. The light intensities at photosensor 20 and reference point 28 are made up of components of both light from the outside arriving through the windows, and light from fixtures 24. In general, the intensities of the components of daylight and artificial light at the photosensor and reference point are a linear function of the intensity of the daylight and artificial light sources. Thus, one can define various relationships as follows:

$$I_{SD} = F_{SD} I_D \quad (1)$$

$$I_{RD} = F_{RD} I_D \quad (2)$$

$$I_{SA} = F_{SA} I_A \quad (3)$$

$$I_{RA} = F_{RA} I_A \quad (4)$$

$$I_S = I_{SD} + I_{SA} = F_{SD} I_D + F_{SA} I_A \quad (5)$$

$$I_R = I_{RD} + I_{RA} = F_{RD} I_D + F_{RA} I_A \quad (6)$$

where $I_D$ is the outside ambient or day light intensity;
$I_A$ is the artificial light intensity from fixtures 24;
$I_S$ is the total light intensity at photosensor 20;
$I_R$ is the total light intensity at reference point 28;
$I_{SD}$ is the daylight intensity at photosensor 20;
$I_{RD}$ is the daylight intensity at reference point 28;
$I_{SA}$ is the artificial light intensity at photosensor 20;
$I_{RA}$ is the artificial light intensity at reference point 28;
$F_{SD}$ is a daylight proportionality factor at photosensor 20;
$F_{RD}$ is a daylight proportionality factor at reference point 28;
$F_{SA}$ is an artificial light proportionality factor at photosensor 20; and
$F_{RA}$ is an artificial light proportionality factor at reference point 28.

$F_{SD}$, $F_{RD}$, $F_{SA}$, and $F_{RA}$ are all independent of any value of light intensity whether natural or artificial and are dependent only upon physical characteristics of the room such as reflectances and the room geometry.

It is clear that reference point 28 and photosensor 20 are disposed relatively symetrically with respect to the dotted window centerline shown at 30, so one would expect $F_{SD}$ and $F_{RD}$ to be similar in magnitude. However, reference point 28 receives light directly from the ceiling mounted fixtures, while the photosensor being ceiling mounted, receives artificial light only indirectly, after many interreflections and considerable attenuation by the interior room surfaces. Alternatively, one can cover the photosensor, or use filters or similar techniques to permit the photosensor to discriminate between artificial and natural light. One can therefore reasonably assume $F_{RA}$ to be considerably greater than $F_{SA}$.

Figure 2:
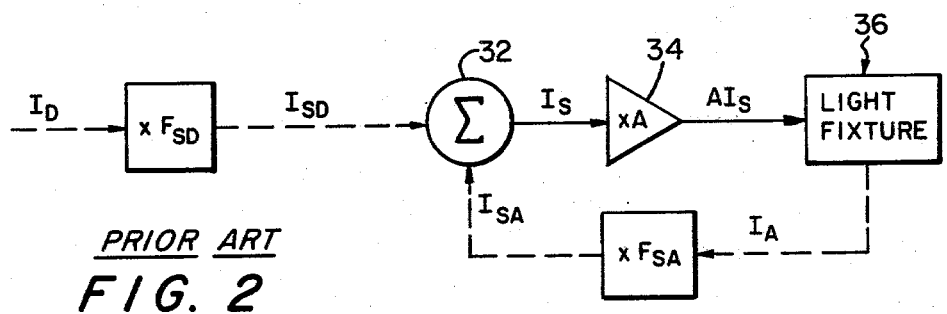
FIG. 2 is a schematic representation in block form of a closed-loop control system typical of the prior art.

With the parameters relating to a typical installation thus defined, and with reference to FIG. 2, one can now demonstrate the major problem with the normal closed loop system. The prior art system of FIG. 2 (in which light rays are depicted in broken line and electrical signals as solid lines) typically includes photosensor 32 which serves as a summing junction for input artificial light $I_{SA}$ and for input daylight $I_{SD}$ to provide an output signal proportional to the total light intensity $I_S$. The latter amplified by gain factor A in amplifier 34 provides a control signal which governs the intensity of the output signal $I_A$ from an artificial lighting fixture 36.

The input $I_{SD}$ to sensor 32 is the daylight intensity $I_D$, which is modified by a sensor daylight factor $F_{SD}$ before it reaches the summing junction. The artificial light intensity $I_A$ modified by a sensor artificial light factor $F_{SA}$ provides the feedback signal $I_{SA}$ to sensor 32. Hence we can assert that $$I_S = F_{SD} I_D + F_{SA} I_A \text{ and} \quad (7)$$

$$I_A = A I_S \quad (8)$$

Substituting equation (8) in (7) one obtains:

$$I_A = A F_{SD} I_D + A F_{SA} I_A \quad (9)$$

Rearranging terms:

$$I_A = \left[ \frac{A F_{SD}}{1 - A F_{SA}} \right] I_D \quad (10)$$

Since A is very large in a closed loop control system, we can approximate equation (10) as:

$$I_A = \left[ \frac{F_{SD}}{F_{SA}} \right] I_D \quad (11)$$

To control the parameter $I_R$ as defined in equation (6) so that $I_R$ is constant regardless of changes in $I_D$, calculate $I_R$ as a function of $I_D$ for this system:

$$I_R = F_{RD} - \left[ \frac{F_{RA} F_{SD}}{F_{SA}} \right] I_D \quad (12)$$

$$I_R = \left[ \frac{F_{RD} F_{SA} - F_{RA} F_{SD}}{F_{SA}} \right] I_D \quad (13)$$

Note that for $I_R$ to be independent of $I_D$ would require $F_{RD} F_{SA} = F_{RA} F_{SD}$. However, these parameters are controlled by the room reflectances and sensor placement as indicated earlier and are not generally able to be modified. As a result, it is practically impossible to achieve the desired independence of $I_R$ and $I_D$ in a normal closed loop system except under a most fortuitous set of circumstances.

Figure 3:
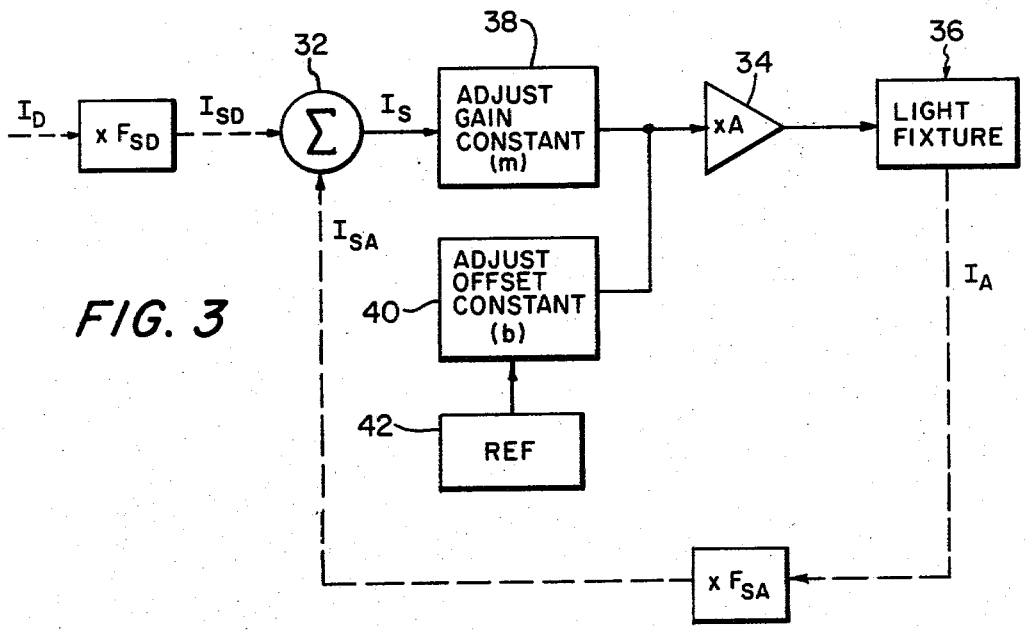
FIG. 3 is a schematic representation in block form of a control system embodying the principles of the present invention.

A generalized form of the present invention is shown schematically in FIG. 3 wherein elements and inputs similar to those of FIG. 2 are indicated by like notation. In the system of FIG. 3 the intensity of light input $I_S$ is related to the intensity of the artificial light output $I_A$ by a generalized linear equation.

$$I_A = m I_S + b \quad (14)$$

where m and b are respectively a gain constant provided by component 38 and an offset constant provided to the system by component 40 derived from reference signal source 42, m and b being adjustable by the system user.

Note that in FIG. 3, the elements added between photocell 32 and amplifier 34 constitute the sole modification, the remainder of the components being unchanged from the system shown in FIG. 2. The room constraints assumed for the closed loop analysis remain unchanged in this analysis as well.

One can similarly analyze the system of FIG. 3 as follows:

From equations (5), (2) and (14) one obtains $$I_S = I_{SD} + I_{SA} = F_{SD}I_D + F_{SA}I_A = F_{SD}I_D + F_{SA}(m I_S + b) \quad (15)$$

Combining terms allows this to be reduced to:

$$I_S = \frac{F_{SD}I_D + b F_{SA}}{1 - m F_{SA}} \quad (16)$$

and $$I_A = \frac{m F_{SD}I_D + b}{1 - m F_{SA}} \quad (17)$$

Substituting equation (17) into equation (6) one obtains the general expression:

$$I_R = F_{RD}I_D + \frac{m F_{SD}F_{RA}}{1 - mF_{SA}} I_D + \frac{bF_{RA}}{1 - mF_{SA}} \quad (18)$$

To achieve the requirement that $I_R$ be constant irrespective of $I_D$ means that:

$$F_{RD} = -\frac{mF_{SD}F_{RA}}{1 - mF_{SA}} \quad (19)$$

and thus $$m = \frac{F_{RD}}{F_{SA}F_{RD} - F_{RA}F_{SD}} \quad (20)$$

Note that equation (20) defines a unique value of m such that the requirement on $I_R$ is now satisfied. This value of m is dependent only on the factors earlier defined as fixed by the room geometry and reflectances and is in no way dependent on either the daylight intensity, $I_D$, or the artificial light intensity, $I_A$. This is important, because it shows that by proper adjustment of the factor m, the system can be implemented in such a way as to cause the photosensor to ignore completely the artificial light component which it receives and to control the reference lighting level as if it sees daylight variations only.

Recalling the earlier discussion of the relative magnitudes of the various factors, with $F_{RD}$ and $F_{SD}$ being similar in magnitude and $F_{RA}$ being considerably greater than $F_{SA}$, it will be apparent that m will be less than zero for a typical installation. In a situation where no artificial light at all reached the sensor, $F_{SA} = 0$ and $$m = -\frac{F_{RD}}{F_{RA}F_{SD}}.$$

As the artifical light component at the sensor becomes larger than zero, m itself approaches infinity, at which point $F_{SA}F_{RD} = F_{RA}F_{SD}$ and the system operates correctly as a normal closed loop mechanism. For intermediate values of $F_{SA}$ the system operates as a mixture of open and closed loop responses, but as long as $F_{RA}F_{SD}$ is maintained larger than $F_{SA}F_{RD}$ the open loop system predominates. This tends to be the case in the typical installation shown and the ratio $$\frac{F_{RA}F_{SD}}{F_{SA}F_{RD}}$$

can be further improved by modifying the location and spatial response of the photosensor to favor a large value of $F_{SD}$ and a small value of $F_{SA}$. The accentuation of the open loop response over the closed loop response is desirable to enable good performance to be achieved without critical adjustments being required, and also suppresses any oscillatory tendencies which may arise because of uncontrolled dynamic parameters in the closed loop system response.

Figure 4:
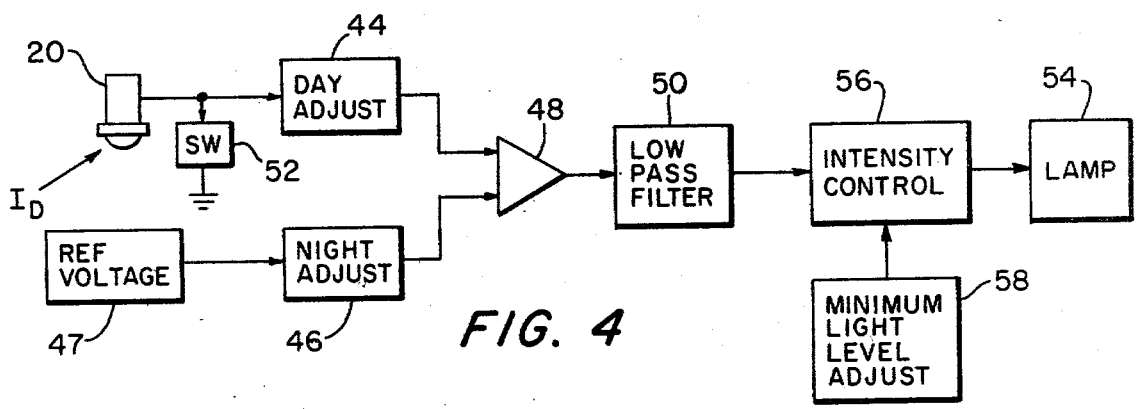
FIG. 4 is a block diagram of one implementation of the control system of the diagram in FIG. 3.

Referring to FIG. 4, a generalized implementation of the present invention comprises photovoltaic cell 20, illuminated primarily by natural light, the output signal from photocell 20 being controlled by daylight adjustment means 44 intended to provide the gain constant m. Adjustment means 44 typically comprises a potentiometer coupled to the output of photocell 20. Night adjustment means 46 are also provided, typically as a potentimeter connected to one side of a reference voltage source 47 to yield a constant output signal exemplifying the offset constant b. The outputs of daylight adjustment means 44 and night adjustment means 46 are coupled as inputs to combining amplifier 48. The latter is typically a summing operational amplifier. The output of amplifier 48, the sum of the output from daylight adjustment means 44 and night adjustment means 46, is then applied to the input of low-pass filter 50 typically formed of an integrating operational amplifier. A photocell disable switch 52 is provided to allow photocell 20 to be temporarily disabled during system adjustments by coupling the photocell to ground. The output of filter 50 is used as a control signal to vary the artificial light output from lamp 54 through control of an artificial light intensity control system 56. A minimum artificial light level adjustment 58 can be provided in case the lowest level of artificial light output is desired to be greater than zero.

In normal operation, photocell disable switch 52 is open and minimum artificial light adjustment 58 is set to zero. The light falling on photocell 20 causes a proportionate output signal to be applied to daylight adjustment means 44. Night adjustment means 46 and daylight adjustment means 44 provide input signals to combining amplifier 48, the output signal from which is then proportional to the level of light on photocell 20 and the setpoints of adjustment means 44 and 46. Low-pass filter 50 receives this composite signal and removes rapid variations, applying the smoothed results to control the artificial light intensity control system 56. The latter is designed to reduce artificial light output as the light level on photocell 20 increases, or as daylight adjustment means 44 is varied to increase or night adjustment means 46 is varied to decrease their respective outputs. Therefore, as photocell 20 senses an increase in the natural light level, the intensity of the artificial light from lamp 54 is decreased to compensate and energy is saved. A decrease in natural light level causes an inverse change in the artificial light level.

To aid in visualizing the system function, consider the use of the invention to maintain an illumination of 75 footcandles in a typical installation. In operation, to initially determine the setting of daylight adjustment means 44 and night adjustment means 46, one should first remove the effect of photocell 20 as by waiting until darkness has fallen. Under this condition, no output from photocell 20 is generated so varying daylight adjustment means 44 will have no influence on the artificial light level. This condition of no natural illumination at photocell 20 corresponds to the leftmost edge of the graph in FIG. 5 when the natural light level, $I_D$, is zero. Now night adjustment means 46 is varied until the desired illumination of 75 footcandles is achieved, which would define Point A on the graph of FIG. 5.

Assume now that the actual level of natural light becomes 50 footcandles at some later time. Consequently, photocell 20 provides an output appropriate for a 50 footcandle natural illumination level. Daylight adjustment means 44 is now varied until the total illumination, $I_T$, is again 75 footcandles, as at Point B. To achieve this, the artificial light level will be reduced to 25 footcandles, as at Point C, since this is the difference between the desired 75 footcandles level and the 50 footcandles available from natural sources. The control system then provides an artifical light level shown by the line, $I_A$, and defined by setting Points A and C. The artificial level is such that it always makes up the difference between the natural light and the desired total light for all levels of natural illumination below the desired total level, in this case 75 footcandles. Above 75 footcandles the artificial light output is zero and the total illumination is simply equal to the natural illumination as shown by dotted line $I_t$. Therefore, the artificial light used is only that required to provide the desired total illumination and no more, and energy is saved when natural light is available.

It is also possible to set both adjustments without waiting for darkness by use of photocell disabling switch 52. In this case, assume 50 footcandles are available from natural sources again. Photocell disabling switch 52 is closed and again the daylight adjustment means 44 can have no effect on the artificial light level. Because the system sees no natural light input, the artificial light output increases to a level that would correspond to zero natural light under normal operation. Since it is desired to hold 75 footcandles, one would like to set this output to that level. However, since 50 footcandles already exist from natural sources (to which the control system is temporarily unresponsive) night adjustment means 46 is set to give a total illumination level of 125 footcandles. This would correspond to the 50 footcandles of natural light and an additional 75 footcandles of artificial light. At this time, the photocell disabling switch 52 would be opened and daylight adjustment means 44 can be set as described previously.

It is also recognized that in some cases the artificial illumination level will not be able or may not be desired to go to zero, due to limitations of artificial light intensity control system 56 or due to a desire to provide the user with a visual cue to indicate that the lights are energized, or any other possible reason.

Figure 5:
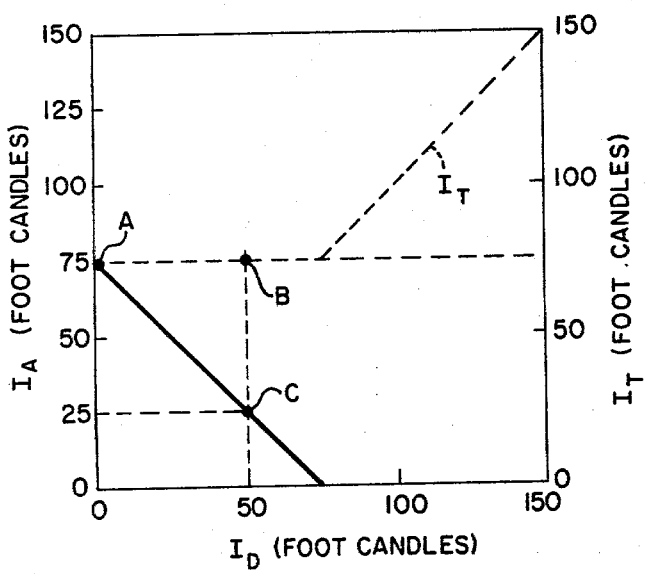
FIG. 5 is a graphical plot illustrative of the operation of the control system of FIG. 4.
Figure 6:
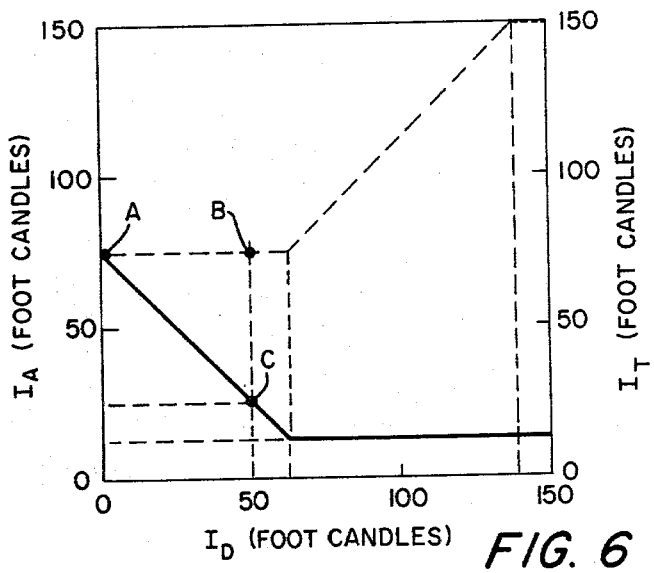
FIG. 6 is a graphical plot illustrative of another form of operation of the control system of FIG. 4.

This capability is provided by the inclusion of minimum artificial light adjustment 58. FIG. 6 describes the operation of such a system. Note that all points referred to in the previous discussion of FIG. 5 are present and identical in FIG. 6, so the preceding discussion of the detailed operation and adjustment of the system applies also to the system shown in FIG. 6. The only difference is that FIG. 6 includes $I_m$, the minimum artificial illumination level which is set by the characteristics of artificial light intensity control system 56 or by the adjustment of minimum artificial light adjustment 58, and is shown to be about 10 footcandles, but could be any suitable level. Operation of the system illustrated in FIG. 6 is identical to that of FIG. 5 until a natural illumination level greater than 65 footcandles is achieved. At this point the artificial illumination level has reached its minimum level of 10 footcandles and does not decrease any further with increases in natural illumination. The total illumination begins to increase with increasing natural illumination starting at a natural illumination level of 65 footcandles in FIG. 6, whereas this point did not occur until the natural illumination level was 75 footcandles in FIG. 5. Therefore, the only operational difference between the systems of FIGS. 5 and 6 is that for all natural illumination levels above 65 footcandles the total illumination in FIG. 6 is greater than that in FIG. 5. Since the maximum difference is 10 footcandles, this is a fairly minor deviation and the system of FIG. 6 therefore essentially includes all the significant features and advantages of the system of FIG. 5.

Figure 7:
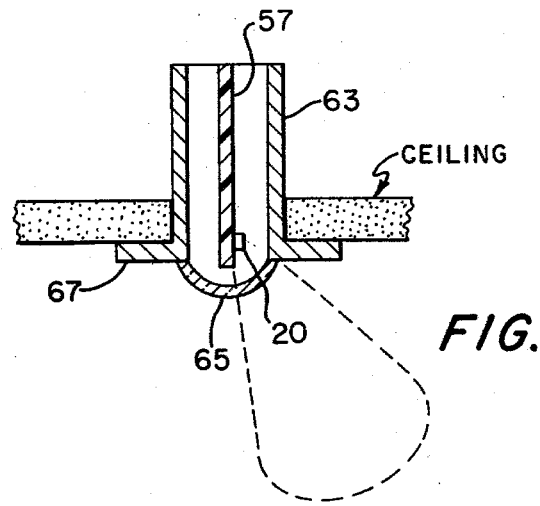
FIG. 7 is a section view in elevation through a photocell mounting useful in the present invention.

A typical ceiling mounted photocell which discriminates to prefer natural light from a window against artificial light from ceiling mounted lighting fixtures is shown in FIG. 7 wherein mounted on printed circuit board 57 is one or more photodiodes 20. Board 57 is vertically positioned within opaque cylinder 63 capped with a translucent diffusing spherical segment 65, preferably one third of a sphere. Thus the photodiode faces one half of the field of view of segment 65. Cylinder 63, adjacent the end capped with element 65, is surrounded by a mounting flange or collar 67 which is intended to fit against a ceiling as shown. The directional sensitivity of the photodiode is shown as the lobe outlined with dotted lines.

Figure 8:
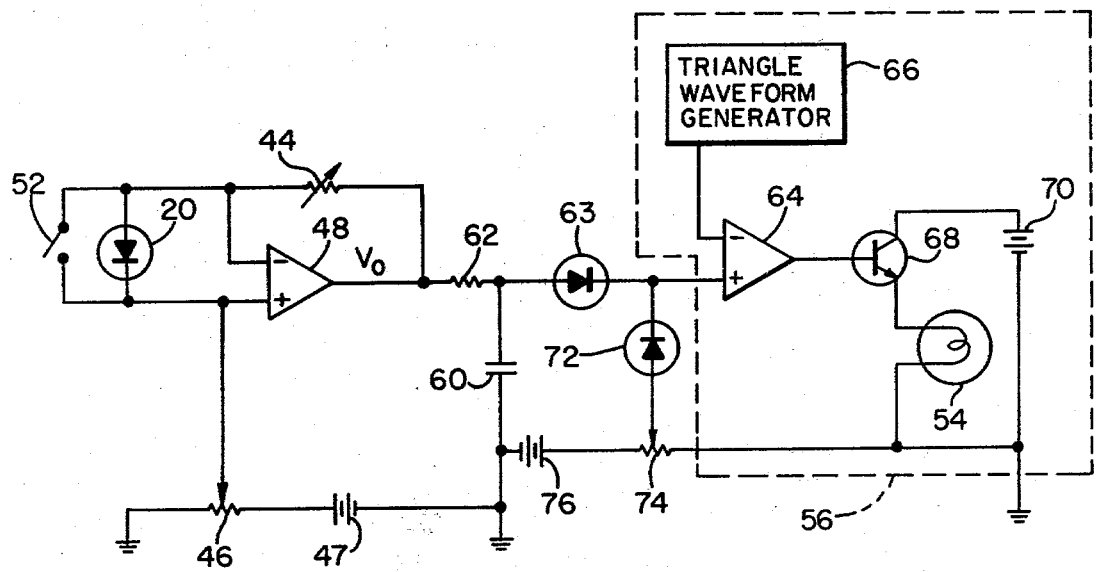
FIG. 8 is a schematic circuit diagram partly in block form, of a preferred embodiment of the control system of the present invention.

In a preferred embodiment of the invention as shown in FIG. 8, photocell 20 is arranged to receive the incident light input of intensity $I_S$ referred to in the earlier analysis. Photocell 20 converts the photon energy to a very small current signal which flows from cathode to anode and is linearly dependent on $I_S$. Amplifier 48 in the form of an operational amplifier has its summing junction or negative input terminal connected to the anode of photocell 20, the cathode of the latter being connected to the non-inverting or positive input terminal of amplifier 48. A variable feedback resistor 44 is coupled between the input terminal and the input summing junction of amplifier 48, to constitute thereby a daylight adjustment means. Night adjustment means are included in the form of potentiometer 46 having its variable tap connected to the non-inverting input terminal of amplifier 48 and its resistive element connected between ground and one side of a reference dc voltage source such as battery 47. The reference voltage source of course can be any of several well-known devices such as a zener diode and the like.

The output terminal of amplifier 48 is connected to a low-pass filter shown schematically as simply comprising shunt capacitor 60 and series resistance 62, but any other type of low-pass filter can be used. The output of the filter in turn is connected through diode 63 to the input of a linear artificial-light intensity control system 56. The latter comprises input comparator amplifier 64 having its non-inverting input terminal connected to the output from filter resistor 62, and its inverting input terminal connected to the output of triangular waveform generator 66. The triangular waveform generator can be a suitable integrated circuit and related electronic components such as the XR-205 Monolithic Waveform Generator sold by EXAR Integrated Systems, Inc. of Sunnyvale, California.

The output of comparator 64 is connected to the base of power switching transistor 68. The collector of the latter is coupled to a dc power source such as battery 70, and the emitter of transistor 68 is connected to one side of lamp 54. The other side of lamp 54 is typically grounded.

Minimum light adjustment means 58 is provided in the form of diode 63 operating in conjunction with diode 72, potentiometer 74 and dc power source or battery 76. Diode 63 is connected with its anode to one side of resistor 63 and its cathode to the non-inverting input terminal of comparator 64. The cathode of diode 72 is also connected to the same non-inverting input terminal, and the anode of diode 72 is connected to the variable tap of potentiometer 74. The resistive element of the latter is connected between one side of battery 76 and ground. The other side of battery 76 is similarly grounded.

In operation of the system of FIG. 8, the output voltage of amplifier 48 varies such that the net current flowing at summing junction from or to photocell 20 and feedback resistor 44 is very close to zero, as is typical of operational amplifiers. Therefore, $V_1$ decreases as the incident light level increases, and the scale factor for this transfer function can be adjusted by varying the resistance of day adjustment means 44. The output voltage from night adjustment potentiometer 46 is applied to the non-inverting input terminal of operational amplifier 48. In the absence of any incident light, $I_S$, the output of voltage $V_o$ of the amplifier will be equal to the voltage applied to the non-inverting input by night adjustment potentiometer 46. As incident light received at photodiode 20 begins to increase, $V_0$ decreases accordingly from the level set by potentiometer 46 and battery 47. The response of $V_0$ to the incident light input $I_S$ can be described by the following equation:

$$V_0 = K_1 I_S + C_o \qquad (21)$$

where $K_1$ is a scale factor constant set by the value of day adjustment means 44 and $C_o$ is a fixed offset value which is controlled by night adjustment potentiometer 46 and battery 47. Combining this equation with the response shown for the linear artificial light intensity control system 56 one obtains an overall system response of $$I_A = K_1 K_2 I_S + C_o K_2 \qquad (22)$$

where $K_2$ is a scale factor associated with the linear artificial light intensity control system 56.

Equation (22) is equivalent to the desired form found earlier in equation (14) with $m = K_1 K_2$ and $b = C_o K_2$. The embodiment of FIG. 8 therefore is seen to implement the functional dependence of $I_A$ on $I_S$ which has been shown to be desirable from the standpoint of proper control of the total illumination level.

Photocell disabling switch 52 shorts photodiode 20 so that the generated current is shunted away from amplifier 48. Therefore, amplifier 40 no longer responds to changes in input light level $I_S$ and operates as if $I_S$ were always zero. This corresponds to conditions of total darkness and allows night adjustment means 46 to be properly adjusted even during daylight as was described earlier.

The linear artificial light intensity controller 56 varies the light output of lamp 54 by varying the fraction of the total time available for which the lamp is connected to the DC power source 70. The voltage $V_0$, appropriately filtered by the RC filter of resistor 62 and capacitor 60 is applied as a control voltage to the non-inverting input of comparator 64 while a reference triangular voltage waveform from generator 66 is applied to the inverting input of the same comparator. When the reference triangular waveform is smaller in amplitude than the applied control voltage, the output of comparator 64 is therefore in a high voltage state and power switch 68 is activated, thereby causing DC power source 70 to be connected to lamp 54. When the triangular voltage increases to a level greater than the applied control voltage, the comparator output goes to a low voltage level and power switch 68 disconnects the DC power source from the lamp load.

If the variable control input voltage $V_o$ is zero, then the triangular reference waveform is always larger than the control input and the lamp is always disconnected from the DC power source, so the light output from the lamp is zero. Also, if the control input voltage $V_o$ is equal to the maximum voltage $V_m$ of the triangular waveform, then the triangle voltage would always be less than the control input and the lamp would remain connected to DC power source 70, giving maximum light output. For intermediate values of the control input voltage, $V_o$, the lamp would be connected to DC power source 70 for a fraction of the total time equal to $V_0/V_m$ and the light output would, therefore, vary in a linear manner with variations in $V_0$. The equation relating lamp output to voltage input is, therefore, of the general form:

$$I_A = K V_0$$

where $I_A$ is the artificial light output, $V_0$ the input control voltage and K a constant of proportionality determined by circuit parameters alone.

A minimum artificial light level can be maintained simply by applying some voltage from potentiometer 74 and battery 76 to diode 72. The voltage then at the non-inverting input terminal of comparator 64 depends on which is the higher of the two voltages respectively provided at the anode of diode 72 (due to the setting of potentiometer 74) or at the anode of diode 63 (due to the input control voltage from the filter). Obviously, the comparator input can then never drop below the cathode voltage on diode 72 and a minimum current level must correspondingly be drawn by lamp 54.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. System for controlling the intensity of artificial illumination in a predetermined space incidentally also illuminated by natural light, said system comprising in combination:
   variable intensity source means for artificial illumination for said space;
   means for detecting intensity of said natural light in said space in substantial distinction to the intensity of said artificial illumination and for providing a control signal as a function of the detected intensity of said natural light; and
   controllable means for varying the intensity of said artificial illumination from said source as a function of (a) said control signal and (b) a gain control function which is independent of any detected light intensity and dependent upon physical characteristics of said predetermined space.

2. System as defined in claim 1 including first adjustable means for varying said preselected gain so as to vary the gain to said control signal,
   second adjustable means for providing a second variable signal;
   means for combining said control signal, as modified in accordance with said gain, with said second signal; and
   means for applying the combined signals for controlling said means for varying the intensity of said artificial illumination.

3. System as defined in claim 2 wherein said means for detecting comprises photoelectric means for generating said control signal as an electrical signal, said second adjustable means is a variable electrical source for generating said second variable signal as an electrical signal, and said combining means comprises a system for summing said electrical signals.

4. System as defined in claim 3 wherein a summing operational amplifier constitutes said combining means, the feedback impedance of said amplifier being variable and constituting said means for varying said preselected gain.

5. System as defined in claim 3 including low-pass filter means for smoothing the output of said combining means.

6. System as defined in claim 1 wherein said means for detecting said intensity is adapted to provide said control signal as an inverse function of said detected intensity.

7. System as defined in claim 1 wherein said space is bounded by a ceiling and both said source means and said means for detecting are mounted at said ceiling.

8. System as defined in claim 7 wherein said means for detecting comprises photoelectric means so disposed as to receive substantially none of said artificial illumination directly from said source means.

9. System as defined in claim 1 including means for temporarily disabling the output from said means for detecting so as to simulate conditions of zero natural light.

10. System as defined in claim 1 including means for establishing a minimum light output greater than zero from said source means.

11. An open loop system for controlling the intensity of artificial illumination in a predetermined enclosed space incidentially also illuminated by natural light, said system comprising in combination:
    fixedly positioned photosensor means for detecting intensity of said natural light in said space in substantial distinction to the intensity of said artificial illumination, and for providing an electrical signal as a function of the detected light intensity;
    means for providing artificial illumination for said space at an intensity inversely proportional to $mA+b$ where A is the amplitude of said electrical signal, b is a first constant the value of which is predeterminable, and m is a second predeterminable constant, the value of which is independent of any detected light intensity and is dependent upon physical characteristics of said enclosed space.

12. A system for controlling the intensity of artificial illumination in a predetermined space bounded by a ceiling and incidentially also illuminated by natural light, said system comprising, in combination:
    variable intensity source means mounted at said ceiling for providing artificial illumination to said space;
    means mounted at said ceiling for detecting intensity of said natural light in said space in substantial distinction to the intensity of said artificial illumination and for providing a control signal as a function of the detected intensity of said natural light; and
    controllable means for varying the intensity of said artificial illumination from said source as a function of said control signal.

13. An open loop for controlling the intensity of artificial illumination in a predetermined enclosed space incidentally also illuminated by natural light, said system comprising in combination:
    fixedly positioned photosensor means for detecting intensity of said natural light in said space in substantial distinction to the intensity of said artificial illumination, and for providing an electrical signal as a first function of the detected light intensity; and
    means for providing artificial illumination for said space at an intensity as a second function of (a) said electrical signal and (b) a third function independent of any detected light intensity and dependent upon physical characteristics of said enclosed space.

* * * * *